July 29, 1969 A. KRÜSSMANN ETAL 3,458,812

CIRCUIT ARRANGEMENT FOR AUTOMATICALLY SELECTING THE HIGHEST VOLTAGE OF A NUMBER OF VARYING D.C. SOURCES

Filed Jan. 13, 1966

*Inventors*

ADOLF KRÜSSMANN

JOACHIM VOSS

BY

Kenyon & Kenyon

ATTORNEYS

United States Patent Office 3,458,812

Patented July 29, 1969

3,458,812

CIRCUIT ARRANGEMENT FOR AUTOMATICALLY SELECTING THE HIGHEST VOLTAGE OF A NUMBER OF VARYING D.C. SOURCES

Adolf Krussmann, Hofheim in Taunus, and Joachim Voss, Munich, Germany, assignors, by mesne assignments, to Sulzer Brothers Ltd., Winterthur, Switzerland, a corporation of Switzerland Filed Jan. 13, 1966, Ser. No. 543,757

Claims priority, application Germany, Jan. 13, 1965, Sch 36,379

Int. Cl. G01r *19/00*

U.S. Cl. 324—140 2 Claims

ABSTRACT OF THE DISCLOSURE

A first store system which includes a diode is selectively connected to the relays of a number of varying D.C. sources in sequence while a second store system is connected in a loop to the first store system. The voltage across the capacitor of the first store system is transferred to the capacitor of the second store system and immediately thereafter the first capacitor discharges through a resistance in a third loop formed with this first capacitor. The voltage acting across the capacitor of the second loop is measured on an amplifier connected thereto.

Figures 1, 2:
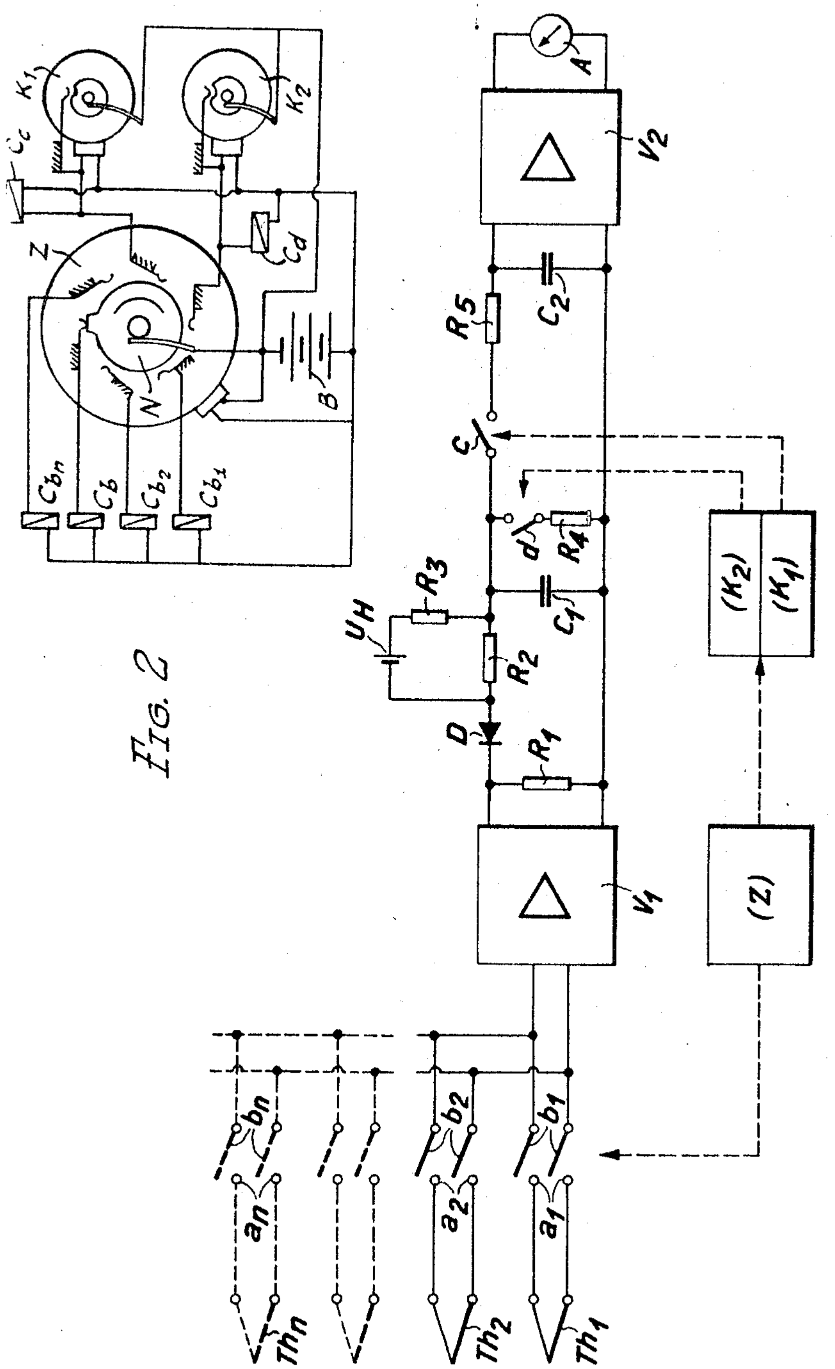

It often occurs in supervisory and control systems that an automatic circuit arrangement is required to provide a continuous detection of the highest voltage of a number of variable D.C. sources. It has been known to use a network of diodes and resistances for this purpose. However, this arrangement is of use only for two voltage sources. Further, such an arrangement cannot deal with very low voltages, such as thermovoltages, since diodes have a relatively high threshold voltage. There also have been devices which determine the maximum value of a varying voltage and are therefore known as peak meters. Devices of this kind are based on some sort of storage system mainly comprising a crystal diode and a capacitor. The capacitor is charged up via the crystal diode to the highest voltage supplied to the device. Usually, some form of amplifier is provided to enable the peak voltage to be indicated on a measuring instrument. However, devices of this kind cannot automatically select the highest voltage of a number of variable D.C. sources.

The invention solves the above problems by using the capacitor store method in a special circuit arrangement. According to the invention, the circuit arrangement has a plurality of voltage sources, each of which is connected to a respective terminal of a plurality of terminals, a store system having a pair of store capacitors, one of which is adapted for parallel connection with a resistance; the other of which is operably connected to an electrical indicating or recording device, a plurality of relay contacts operably connected to the store system for briefly connecting the terminals of the voltage sources to the store system in seriatim, a pair of monostables, one of which operably connects the store capacitors of the store system for transferring the voltage from one capacitor to the other capacitor; the other of which operably connects the one store capacitor in parallel with the resistance, and a ring counter for actuating the relay contacts of the respective voltage sources in seriatim as well as for actuating the monostables in sequential order between actuation of successive relay contacts of the voltage sources. In operation, the terminals to which the voltage sources are connected are briefly connected to the store system seriatim by the relay contacts of the relays operated by the ring counter, and during the time between the end of the ring counter's first cycle and the beginning of the second cycle, the first monostable triggered by the ring counter and having a relay output transfers the voltage of the capacitor store by means of the relay contact to another capacitor to which the electric indicating or recording device is connected. After the first monostable has been restored and the relay contact therefore interrupted, the second monostable is triggered by the ring counter and having a relay output acts, also before the start of the second cycle, to briefly connect the resistance in parallel with the store capacitor by its relay contact.

The highest voltage is therefore detected intermittently, since the various voltage sources are scanned briefly in a periodic sequence according to the cycle time. The cycle time must therefore be small as compared with the voltage alteration if wrong measurements are to be avoided. This condition can be met satisfactorily enough for many technically important purposes. For instance, the circuit arrangement according to the invention, when used in association with electrical temperature-measuring stations whose temperature usually varies slowly, can provide a substantially immediate and continuous indication of the maximum voltage, so that the measured value can readily be used for control purposes.

The invention will be described in greater detail with reference to an embodiment comprising a number of thermocouples as voltage sources, reference being made to the drawings wherein FIG. 1 illustrates a circuit according to the invention; and FIG. 2 illustrates a ring counter and monostable circuit according to the invention.

Thermocouples $Th_1 \ldots Th_n$ are connected to terminals $a_1 \ldots a_n$. Relays which are not shown and which have double-pole contacts $b_1 \ldots b_n$ and which are operated by a continuously rotating ring counter Z briefly connect the terminals $a_1 \ldots a_n$ in a cyclic sequence to the input of an amplifier $V_1$. The number of trigger stages of the ring counter is the same as the number of thermocouple measuring stations. Each such stage controls one relay.

Instead of conventional kinds of relay, contact arrangements known as "protective tube armature contacts" can be used very advantageously. In these devices, magnetizable contacts placed inside protective tubes are operated directly by magnetizing windings, to give much faster switching times and switching sequences.

The amplifier $V_1$ is devised as a measuring amplifier for milli-voltages and delivers a current whose strength is in a fixed relationship to the input voltage. This known kind of amplifier when in electronic form is very useful for the purposes of this invention since it is substantially inertia-free. The amplified voltages of the thermocouples appear across the resistance $R_1$ and are applied via the diode D to the store capacitor $C_1$. Consequently, the voltage across the store capacitor $C_1$ after the first ring counter cycle is proportional to the highest thermocouple voltage at any of the terminals $a_1 \ldots a_n$ during the rotation of the counter.

The ring counter Z also operates two monostables $K_1$, $K_2$ having relay outputs so that they are triggered consecutively in the time between the end of one ring counter rotation or cycle and the start of the next ring counter cycle. The monostable $K_1$ closes the switch *c* so that the voltage across the capacitor $C_1$ is transferred via a resistance $R_5$ to a second capacitor $C_2$. Immediately after the monostable $K_1$ has returned to its initial state thereby reopening the switch *c*, the monostable $K_2$ closes the switch *d* so that the resistance $R_4$ is connected to the capacitor $C_1$. The capacitor $C_1$ then discharges through the resistance $R_4$. The monostable $K_2$ then returns to its initial state opening the switch *d* and the ring counter starts its next cycle. For example, the ring counter Z consists of an electric motor which is fed by a direct current source, for example, a battery B. A cam plate N is fastened on the constantly turning rotor of this motor and has a cam surface which successively touches six contacts as the rotor turns. Four of these contacts communicate with coils $Cb_1 \ldots Cb_n$ which are connected to the relays of the contacts $b_1 \ldots b_n$. The other two contacts are connected to the monostables $K_1$, $K_2$. Each monostable includes an electromotor on the rotor of which a plate having a slot is fixed. In addition, a contact spring is positioned above each slot of a rotor so as to leave an air space between the slot and the spring. Each respective contact spring of a monostable is in contact with a coil $C_c$, $C_d$ which are connected in turn to the switches *c*, *d*. In the position shown in FIG. 2, the monstables $K_1$, $K_2$ are switched off. When the cam of motor Z touches the contact belonging to the electromotor of monostable $K_1$, the associated rotor begins to rotate and actuates coil $C_c$ which in turn closes switch *c*. After one revolution of the rotor of the monostable $K_1$, the monostable is again switched off. Similarly, the rotor of monostable $K_2$ is moved so as to actuate the coil $C_d$ and thereby close the switch *d*. During this time, the rotors of the monostables rotate so fast as to complete one revolution before the cam of the ring counter Z moves from one contact to the other.

The condenser $C_2$ must, if it is to act alternatively with $C_1$, vary the charge thereof to a very small degree if the voltage is to be transferred from $C_1$ to $C_2$ correctly. To this end, the capacitance of the capacitor $C_2$ is much less than the capacitance of the capacitor $C_1$. The function of the resistance $R_5$ is to limit the charging current of the capacitor $C_2$ to the maximum permissible value.

Indicational recording of the voltage which acts across $C_2$ and which is proportional to the selected highest thermovoltages is effected by the use of a proportional amplifier $V_2$ whose input terminals are connected to $C_2$ and whose output is connected to an appropriately calibrated electrical measuring instrument A. The amplifier $V_2$ should have a high enough input resistance to ensure that errors are not introduced because of the capacitor $C_2$ discharging.

To further increase the accuracy of measurement of the circuit arrangement, the threshold voltage of the diode D can be compensated for by an auxiliary voltage in known manner. Accordingly, an auxiliary voltage source $U_H$ co-operates with the resistances $R_2$ and $R_3$, the compensating voltage being dropped across the resistance $R_2$ in series with the diode D. The amplifier $V_1$ can be omitted if the output from the voltage sources suffices for direct operation of the storage system.

What is claimed is:

1. A circuit arrangement for automatically selecting the highest voltage of a number of varying D.C. sources comprising a plurality of voltage sources;

a plurality of relays, each of said relays including a set of contacts connected to a respective one of said voltage sources;

a first capacitor;

a diode;

first connecting means between each said voltage source and respective relay contacts, said first capacitor and said diode wherein closing of a respective relay forms a first closed loop containing said closed relay, said respective voltage source, said first capacitor and said diode;

a second capacitor;

a first resistance;

a first relay switch;

second connecting means between said first and second capacitors, said first resistance and said relay switch wherein closing of said relay switch forms a second closed loop containing said first and second capacitors, said first resistance and said relay switch;

a second resistance;

a second relay switch;

third connecting means between said second resistance, said second relay switch and said first capacitor wherein closing of said second relay switch forms a third closed loop containing said first capacitor, said second relay switch and said second resistance;

a sequential switch means connected to each of said relays and said relay switches for closing each in sequential order in a preset non-overlapping time period; and measuring means connected to said second capacitor for measuring the output thereof.

2. A circuit arrangement as set forth in claim 1 which further comprises an auxiliary voltage source for compensating the threshold voltage of said diode.

References Cited

UNITED STATES PATENTS

| | | | |
|---|---|---|---|
| 2,654,860 | 10/1953 | Lewis. | |
| 2,937,369 | 5/1960 | Newbold et al. | 324—111 X |
| 2,980,861 | 4/1961 | Popowsky | 324—140 X |
| 3,165,694 | 1/1965 | Young | 324—111 |
| 3,193,803 | 7/1965 | Hoffman | 324—111 X |
| 3,329,831 | 7/1967 | Abramson et al. | 317—149 X |

RUDOLPH V. ROLINEC, Primary Examiner

ALFRED E. SMITH, Assistant Examiner

U.S. Cl. X.R.

324—103, 111; 328—116, 137